United States Patent [19]

Nettleton et al.

[11] Patent Number: 4,752,174
[45] Date of Patent: Jun. 21, 1988

[54] AUTO STACKER

[75] Inventors: Burdett B. Nettleton, St. Leonards; Richard B. Thomas; Peter E. Villaume, both of North Sydney, all of Australia

[73] Assignee: CSR Limited, Sydney, Australia

[21] Appl. No.: 770,814

[22] Filed: Aug. 28, 1985

[30] Foreign Application Priority Data

Sep. 5, 1984 [AU] Australia .............................. PG6950

[51] Int. Cl.⁴ ....................... B65G 57/09; B65G 57/18
[52] U.S. Cl. ......................................... 414/36; 414/46; 414/82; 414/110
[58] Field of Search ....................... 414/36, 43, 45, 46, 414/47, 52, 57, 82, 98, 100, 110

[56] References Cited

U.S. PATENT DOCUMENTS

| | | | |
|---|---|---|---|
| 3,056,514 | 10/1962 | Williamson | 414/98 X |
| 3,195,739 | 7/1965 | Hein et al. | 414/45 X |
| 3,241,692 | 3/1966 | Johnson | 414/36 |
| 3,306,475 | 2/1967 | Mays | 271/218 X |
| 3,757,965 | 9/1973 | Renshaw | 414/43 X |
| 4,019,640 | 4/1977 | Marin et al. | 414/45 |
| 4,242,024 | 12/1980 | Buta et al. | 414/43 |
| 4,383,788 | 5/1983 | Sylvander | 414/71 |
| 4,498,381 | 2/1985 | Convey | 414/43 X |

FOREIGN PATENT DOCUMENTS 1255959 2/1961 France .................................. 414/45

Primary Examiner—Leslie J. Paperner
Attorney, Agent, or Firm—Townsend & Townsend

[57] ABSTRACT

An automatic stacking machine for stacking curved articles and placing them on a pallet. Individual articles are guided to a position between two vertical locating plates on top of a catch plate. Once positioned, the catch plate is removed so that the article drops onto one or more horizontal arms. A stack is formed on the horizontal arms in this manner, and the arms can be lowered to place the stack on transport plates. The transport plates hold a stack between two additional vertical plates, one of which rotates to a horizontal position to allow the plate to be pushed, while supported by the other plate, onto a waiting pallet. The pallet is mounted on a pallet frame which can be coupled to other pallet frames and is raised on a rising and lowering platform to be adjacent the stacking machine for loading.

4 Claims, 4 Drawing Sheets

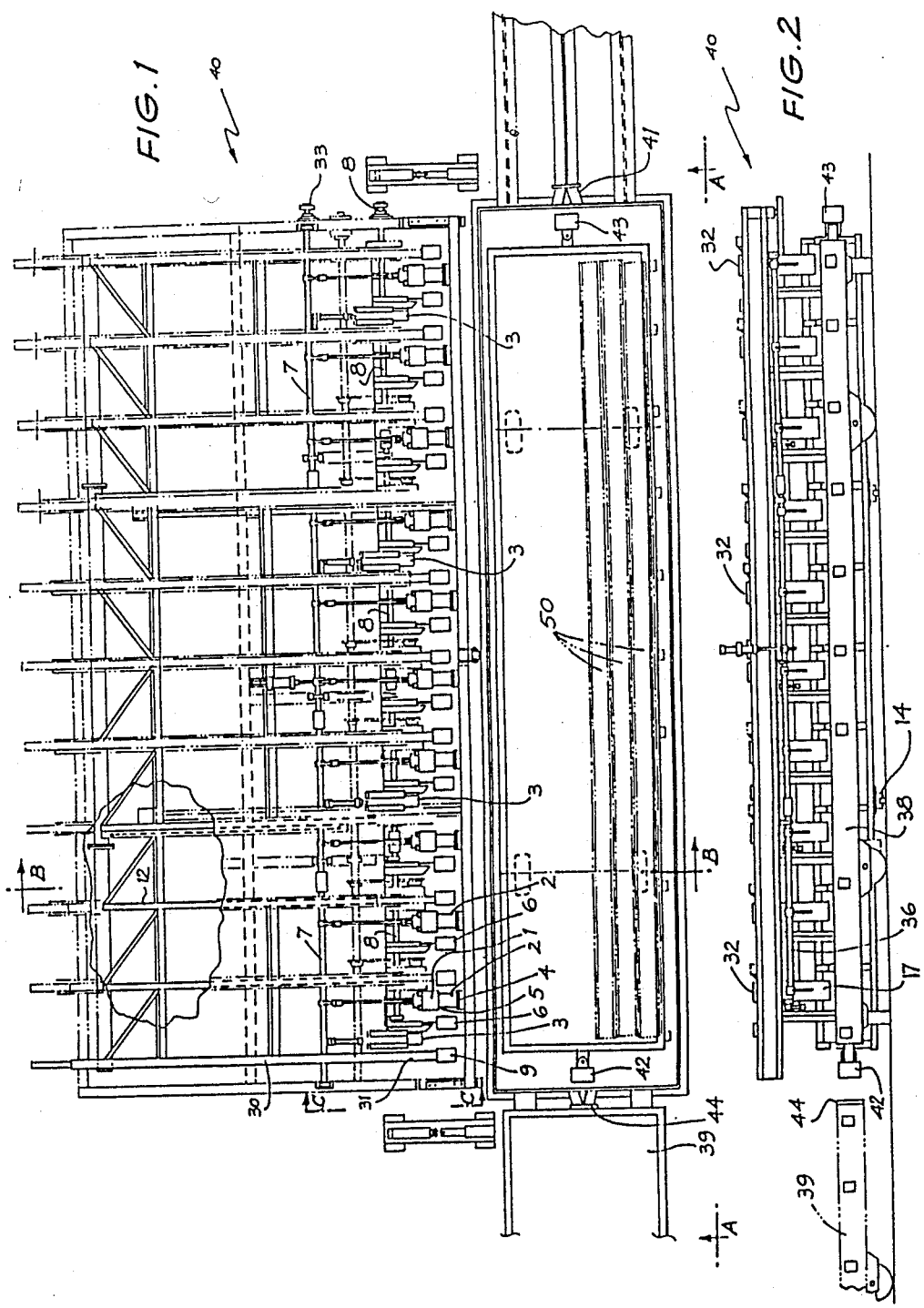

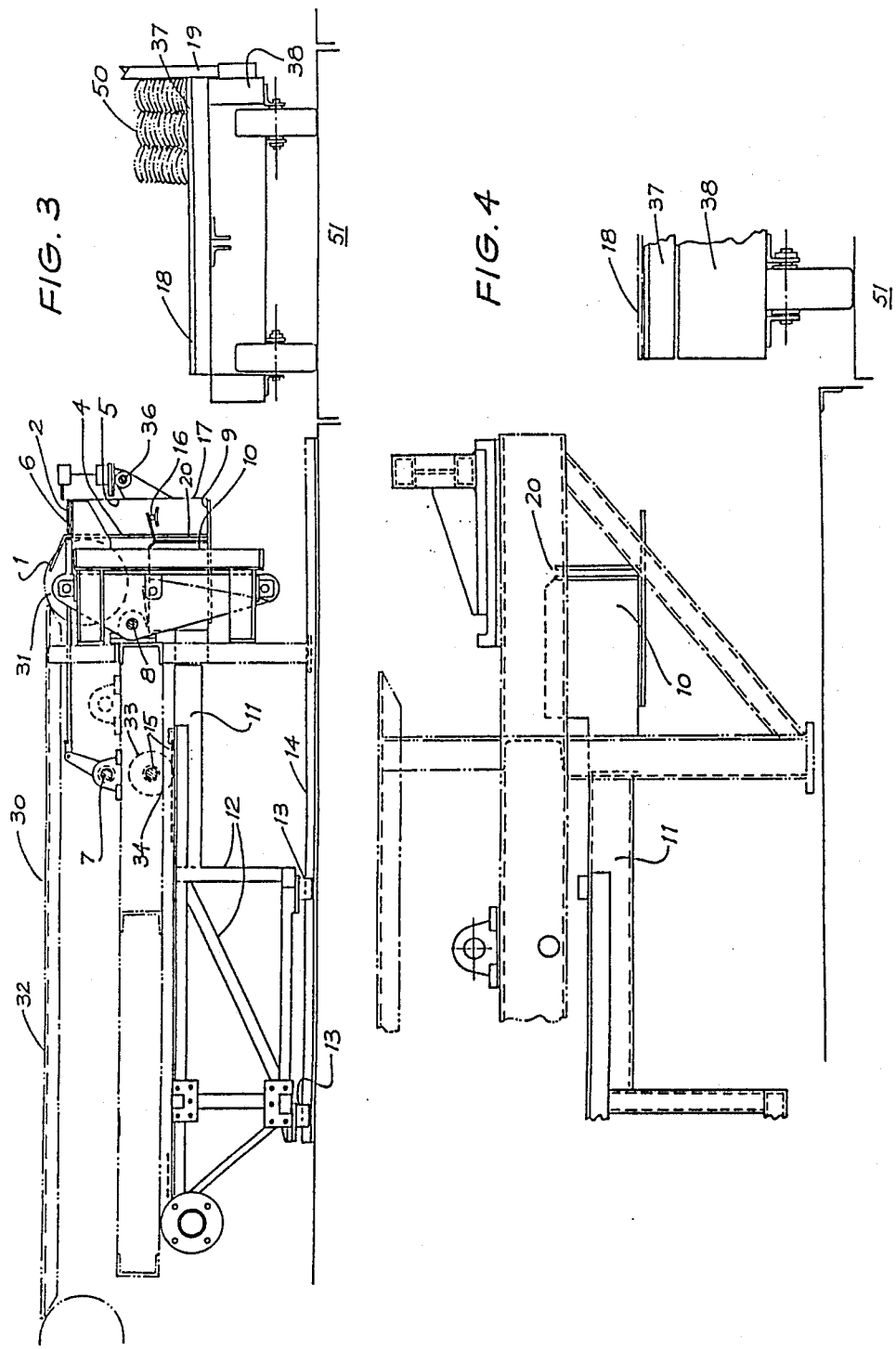

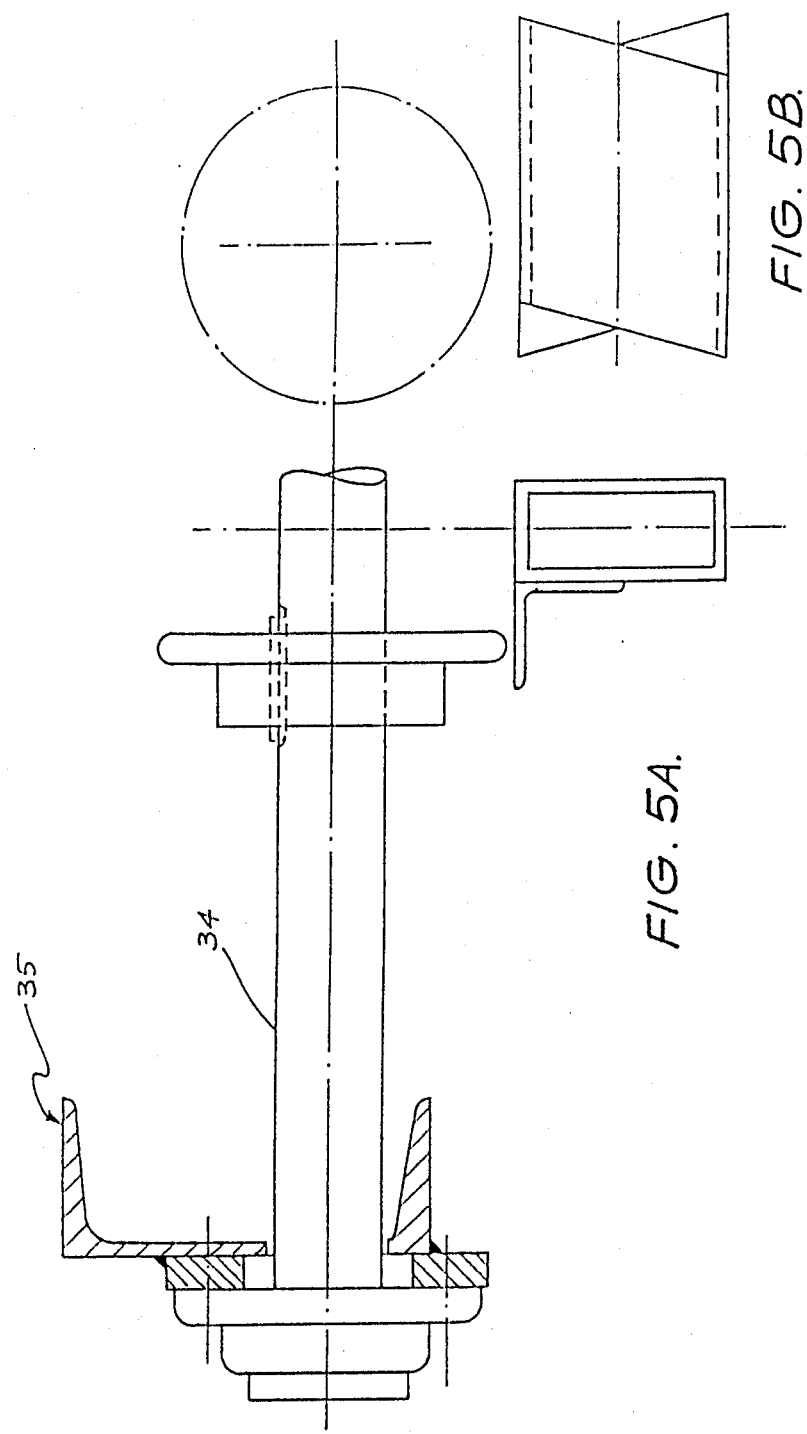

AUTO STACKER

The present invention relates to an apparatus for the automatic stacking on to a pallet or a platform of products that are long and relatively slender, and which are themselves stackable one upon the other, and which are made in batches whose lengths vary from batch to batch.

One type of such a product is plaster based Cornice such as is used for the finishing off of internal corner joints between a wall and a ceiling of a room or space in a building, which has been lined with plaster board sheeting. Without limiting the generality of the invention, a machine of the type is described with particular reference to the automatic stacking of Cornice products, although the invention is equally applicable to other long products having a moulded non rectilinear or a rectilinear cross section that enables them to be stacked one upon the other.

Cornice and other products of the type described are usually delivered from a manufacturing process as single pieces of approximately equal lengths within a given batch of products being made, so that they may be conveniently handled and stored in groups of the same size. Products of this type are usually delivered from their manufacturing process longitudinally or transversely of their length and can be conveniently transported to a loading point by a suitable conveyor.

With presently available production equipment it is usual to stack lengths of Cornice by hand on to a pallet base that is constructed from a sheet of plaster board. Suitable timber blocks are disposed transversely beneath the sheet so that a finished stack, when strapped around the blocks, can be handled conveniently by a fork lift truck equipped with two forks, or if it is a long pallet, with four forks. Such a pallet stack usually has a cross section having a width transversely of the length of the pallet of about 1200 mm and a height of about 800 mm. The pallet length is variable and can be up to 6000 mm. Pallets or stacks of material made up in this way can be handled and stored by stacking one on top of the other, and transported by road truck or similar means.

It is desirable to produce a tightly stacked pallet load of product so that after strapping up the pieces in a stack, they will not become loose during transport because of some pieces being joggled more closely together. If this occurs there is a risk of damaging the product or losing one or more pieces from a pallet stack by having them spear out longitudinally when a transport truck is braked suddenly.

When products of the type described are stacked by hand it is difficult to ensure that evenly and tightly packed stacks are produced because the job is laborious and tedious. With particular regard to Cornices, it is also important to avoid the damaging of the edges of the convex surface which are visible in the installed condition of the product. There is a risk of such damage occurring with manual handling.

It is an object of the present invention to provide an automatic stacking machine which substantially overcomes or ameliorates the abovementioned disadvantages.

According to one aspect of the present invention there is disclosed an automatic stacking machine for stacking articles comprising a stacker; at least one wheeled pallet frame; a rising and falling platform to receive said pallet frame; and a pusher means; wherein said frame is adapted to be releasably secured to said platform, and is adapted to receive from said stacker a layer or layers of articles, said platform raising and lowering said frame as required to complete a stack of said articles, whereupon said pusher means moves said pallet frame.

According to another aspect of the present invention there is disclosed an automatic stacking machine for stacking articles comprising a stacker; at least two wheeled pallet frames adapted to be coupled with like frames; a rising and falling platform to receive said pallet frame; and a pusher means; wherein said frames are adapted to be releasably secured to said platform, which lowers a first of said frames from a base level to receive from said stacker a layer or layers of articles or parts of layers of articles, said platform raising said first frame to said base level whereupon said pusher means moves first frame into contact with a second frame thereby coupling said frames together, and moves said first frame off said platform and said second frame onto said platform to receive said articles.

Preferably this apparatus is used in conjunction with the end of a wide transverse discharge conveyor, in order to assemble articles in stacks of a suitable number. The apparatus places one stack at a time on a pallet frame positioned outside the head of the discharge conveyor. The pallet frame is of a width and length to accommodate the longest article that is to be made. The machine is programmed to place stacks commencing at the outer (far) edge of the pallet frame until one layer is completed and then to repeat the cycle. The wheeled pallet frame is preferably locked in position on the rising and falling platform which can be a scissor lift.

Preferably the rising and falling platform vertically positions an empty pallet frame so that a new layer of articles can be placed on it. The platform then lowers the frame so that a second layer can be placed on the first layer and so on, until a pallet load is built up. On completion, the platform rises to a ground level position so that the full pallet frame can be wheeled off.

Preferably the wheeled pallet frames have a mechanical, electrical or magnetic means at one end for coupling to like frames. Preferably, the pusher means is a wheel mounted pusher capable of travelling a distance of slightly more than the length of a pallet frame and having a mechanical, electrical or magnetic means of coupling to the pallet frame.

Preferably the discharge conveyor is disposed so that finished pieces are transported transversely of their length and spaced apart according to their rate of production and the speed of the conveyor. The discharge conveyor can consist of a number of separate bands on flat or similar conveyors having a common drive shaft and spaced apart a suitable distance so that different length sizes of product can be properly supported over their whole length while being conveyed.

Preferably the discharge conveyor can be arranged so that one end of each product piece will be located on one outside band and the other end supported at or near its end at some intermediate band according to the length size being made or at the band on the opposite outside of the discharge conveyor if pieces of maximum design length are being manufactured.

An embodiment of the present invention will now be described, by way of example only, with reference to the following drawings in which:

FIG. 1 is a plan view of an embodiment of the present invention;

FIG. 2 is a front elevation along A—A of the apparatus of FIG. 1;

FIG. 3 is a side elevation along B—B of the apparatus of FIG. 1.

FIG. 4 is another side elevation along C—C of the apparatus of FIG. 1; and

Figure 5:
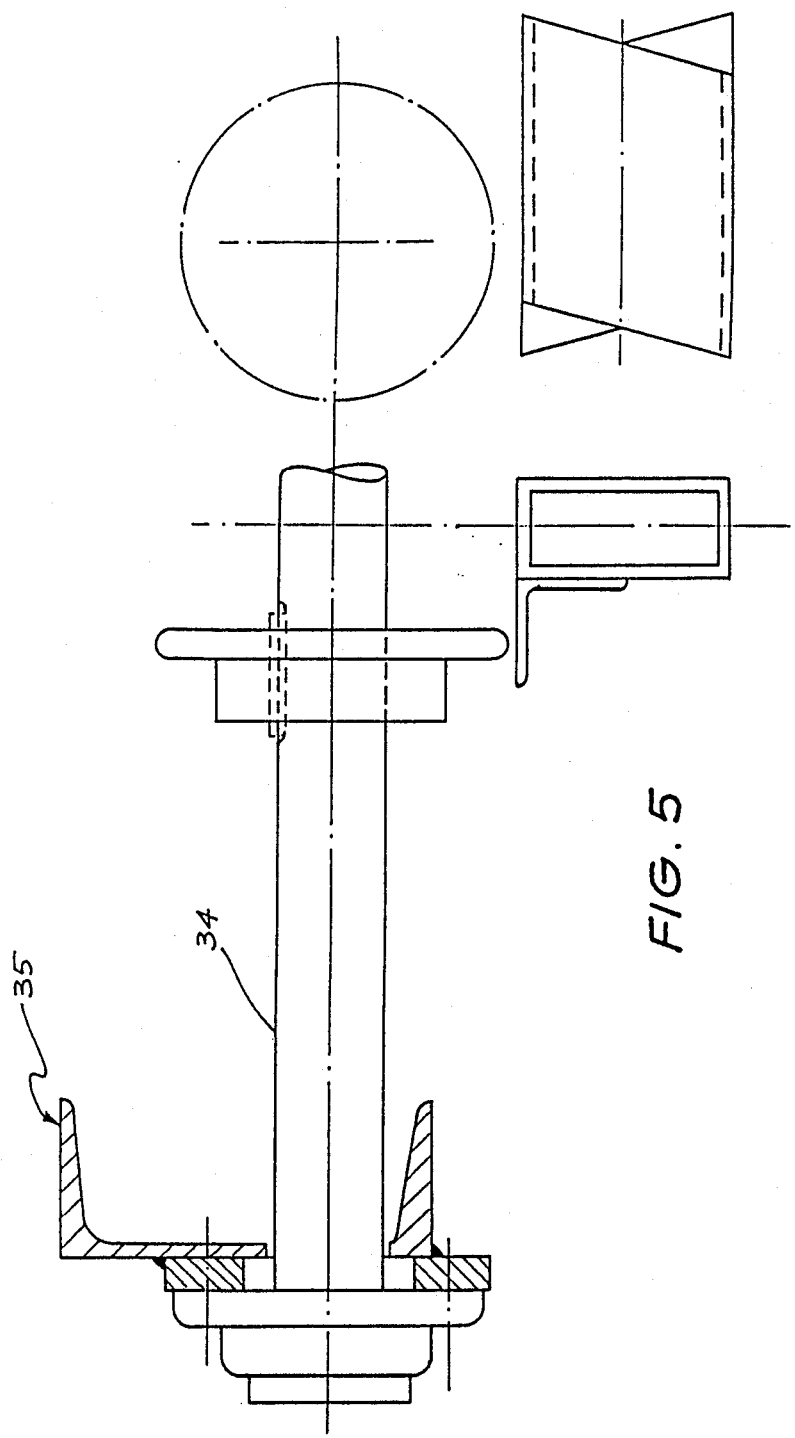
FIGS. 5A and 5B are side and front views, respectively, showing the scrap detail of item 33 of the apparatus of FIG. 1.

As illustrated in FIGS. 1 to 5 a piece (not illustrated) arrives at the head end of a discharge conveyor 30 and commences to slide off and down discharge plates 1 alongside each conveyor band head pulley 31. The leading edge of the piece rests on horizontal catch plates 2 and a signal from a machine controller (not illustrated) energises a small number of horizontal push arms 3 that advance and push the piece fully on to the catch plates 2 so that it is constrained by front vertical 'magazine' plates 5 and back vertical 'magazine' plates 4. Alongside, but set below each catch plate 2, is a horizontal lowering arm 6. After the piece has been set on the catch plates 2 as described above, all catch plates 2 are withdrawn together rapidly being linked together to a common actuating shaft 7. The piece then falls through a short distance to lowering arms 6 while being constrained by the above mentioned front and back magazine plates 5 and 4.

The catch plates 2 are reset to await the next piece and the lowering arms 6 drop vertically together a distance equal to one piece thickness. Lowering arms 6 are attached to transmission chains which are wrapped around top and bottom guide shafts and linked together through sprockets mounted on a common drive shaft 8, as shown in FIG. 3.

A second piece is deposited in the same way on top of the piece first collected on the lowering arms 6 and the cycle is repeated so many times as is necessary to give a stack 50 of a predetermined number of pieces on the lowering arms 6. The number of pieces that make up a stack 50 can be predetermined by selection on the machine controller.

The lowering arms 6 then drop with their constrained stack 50 through a further distance alongside and past a set of transport plates 9 by a short distance so that the stack 50 then rests on the transport plates 9. In the subject machine there are eleven (11) transport plates 9, ten (10) catch plates 2 and ten (10) lowering arms 6 associated with eleven (11) bands 32 on the discharge conveyor 30 and the stacks 50 consist normally of 10 pieces.

Each transport plate 9 is part of a transport head mechanism 10 which is mounted adjustably on a cantilever arm 11. The eleven (11) cantilever arms 11 are connected by a substantial transverse framework 12 that is fitted with four (4) shoes 13 that slide on tracks 14. It is also equipped with a sprocket 33 and chain drive 15. The sprockets 33 being mounted on a suitable transverse drive shaft 34 is in turn mounted on the discharge conveyor frame 35.

On receipt of the above mentioned stack 50 on to the transport plate 9, clamp arms 16 on each transport head 10 are engaged on to the top of the stack 50 to steady it and a set of lower front magazine plates 17 move on pivots 36 from their vertical position through 90 degrees to a horizontal position. The transport frame 12 with its heads 10 and plates 9 and stack 50 commences to move outwards towards the waiting pallet base 37, resting on wheeled pallet frame 38 and so clearing under the raised front magazine plates 17. When the transport plates 9 and stack 50 have moved forward sufficiently to clear the lowering arms 6, these reset together through a vertical upwards motion to their original positions and await the next piece to be discharged by the above mentioned catch plates 2.

Upon the stack 50 reaching the far edge of the surface 18 of the pallet 37, located on the pallet frame 38 which is positioned on a rising and falling platform 51 or a previously deposited stack 50, located on the pallet 37 by travelling a suitably programmed distance, the transport frame 12, cantilever arms 11 and plates 9 with stack 50 slows down and stops. The pressure on the above mentioned stack 50 clamps 16 is released and the transport plates 9 are withdrawn quickly, in unison each actuated by an air cylinder (not illustrated) in each head 10, and the stack 50 drops a short distance to rest on the pallet surface 18 (or a previously deposited layer). When dropping, the stack 50 is constrained along its front outside face by either a set of removable posts 19 on the wheeled pallet frame 38 or a previously deposited stack 50 of the same layer. It is constrained along its back by a back plate 20 mounted on each transport head 10. The back plates 20 are mounted slidably with spring return (not illustrated) on the transport heads 10 and each back plate 20 is provided with an air bag (not illustrated) behind it.

Back plates 20 form part of the rear magazine guide in line with back magazine plate 4 to support the stack 50 as it descends onto the transport plates 9. When the lowering arms 6 have deposited the stack 50 on the transport plates 9 the clamps 16 hold the stack 50 in place as the transport frame 10 carries the stack 50 out onto the pallet 18. When the stack 50 reaches the correct position as nominated by the electrical control system, the transport plates 9 withdraw and the stack 50 drops onto the pallet 18 next to the previously deposited stacks 50 or the posts 19. The pneumatic air bags (not illustrated) between the back plates 20 and the transport heads 10 are then inflated to push the back plates 20 and the new stack 50 firmly against the posts 19 or the stack 50 previously placed on the pallet 18 to ensure the stacks are firmly packed. The air bags are then deflated and the spring return mechanism retracts back plates 20 to their original position and the transport arms 11 including transport plates 9, back plates 20 and transport heads 10 are withdrawn ready to receive the next stack 50 from the lowering arms 6.

The automatic stacker 40 is equipped with controlled speed motors (not illustrated) and limit switches (not illustrated) and is controlled by a programmable machine controller. By selecting the correct number of pieces that make up a stack 50, and an accumulation of time is effected so that a completed pallet pack can be removed from its stacking position to its tieing off and unloading position. An empty pallet can be positioned for loading within the cycle time for the accumulation of a prepared stack of pieces from a continuous production line. No adjustment is necessary for the stacking of batches having different lengths other than the preparation of a pallet base 37 of the right length.

The construction described produces firmly packed layers of product and consequently a firmly and closely packed pallet load.

When the first pallet frame 38 is full the second pallet frame 39 is pushed so that the coupler 42 couples with the coupler plate 44 on the first pallet frame 38 so that it in turn pushes the first pallet frame 38 endways to a tieing off and unloading position and then, after the second pallet frame 39 uncouples itself from the first pallet frame 38, the second pallet frame 39 returns to the loading position on the above mentioned platform. The pusher 41 and coupler plate 45 then uncouples from the coupler 43 and returns to a park position.

While the second pallet frame 39 is being loaded, the load on the first pallet frame 38 is suitably strapped up, manually or automatically and is then removed by a forklift truck. When the second pallet frame 39 is loaded the process is repeated in reverse.

It will be understood, that the dimensions, materials and instructions appearing in all the drawings which accompany this specification, including FIGS. 1 to 5 and the other representations as illustrated on the sheets, in no way limit the invention in either the materials used, the dimensions, sizes configurations or in any other way whatsoever.

Further, the foregoing describes only one embodiment of the present invention and modifications, made by those skilled in the art, can be made thereto without departing from the scope of the present invention.

We claim:

1. An automatic stacking machine for stacking elongated articles having a non-rectilinear cross section, comprising:
    a pair of first and second opposed vertical plates (4, 5);
    means for guiding (1) one of said articles to a position between said vertical plates;
    at least one horizontal catch plate (2) disposed between said vertical plates for supporting said article;
    means for rapidly withdrawing (7) said catch plate to allow said article to fall;
    at least one horizontal lowering arm (6) disposed beneath said catch plate for catching said article;
    means for lowering (8) said lowering arm to allow the stacking of said articles on said lowering arm;
    a pallet frame; and
    means for pushing a stack of said articles from said lowering arm onto said pallet frame.

2. The automatic stacking machine of claim 1 wherein said means for pushing comprises:
    at least one horizontal transport plate (9) disposed adjacent said lowering arm to support said stack of articles when said lowering arm is lowered beneath said transport plate;
    at least one clamp arm (16) for applying pressure to a top of said stack;
    a third vertical plate (17) disposed beneath said second vertical plate for supporting said stack of articles, said third vertical plate being rotatable to a horizontal position to allow passage of said stack onto said pallet frame;
    means for advancing (10) said transport plate across said third vertical plate in said horizontal position to said pallet frame; and
    at least one vertical back plate (20) coupled to said means for advancing for holding said stack in position on said transport plate.

3. The automatic stacking machine of claim 2 further comprising means for advancing and retracting said back plate to joggle said stack firmly into position on said pallet frame.

4. The automatic stacking machine of claim 1 further comprising:
    at least a second wheeled pallet frame adapted to be coupled to said first-mentioned pallet frame; and
    a rising and falling platform for supporting one of said pallet frames and positioning said pallet frame adjacent said means for pushing.

* * * * *